United States Patent [19]

Thompson

[11] 4,262,954
[45] Apr. 21, 1981

[54] FRONTAL ASSEMBLY FOR VEHICLES

[76] Inventor: Marlon H. Thompson, Rte. 8, Box 121, Carthage, Miss. 39051

[21] Appl. No.: 21,164

[22] Filed: Mar. 15, 1979

[51] Int. Cl.³ .............................................. B62D 35/00
[52] U.S. Cl. .................................... 296/1 S; 105/2 R; 296/91
[58] Field of Search .................. 296/1 S, 91; 105/2 R, 105/2 A

[56] References Cited

U.S. PATENT DOCUMENTS

| 2,792,254 | 5/1957 | Hagglund | 296/91 |
| 3,015,517 | 1/1962 | Thornburgh | 296/91 |
| 3,022,848 | 2/1962 | Heiser | 296/91 |
| 4,043,587 | 8/1977 | Giallourakis | 296/91 |

Primary Examiner—John J. Love
Assistant Examiner—John A. Carroll
Attorney, Agent, or Firm—Ancel W. Lewis, Jr.

[57] ABSTRACT

A frontal assembly for mounting on the front of a vehicle that serves to reduce drag, increase wheel traction and shield the windshield. A deflecting plate with a convex frontal surface extends up and back along a smooth, continuous curve of a selected radius as viewed from the side so as to cause the air to flow upwardly and rearwardly in a rolling action and then back over the roof of the vehicle. The deflecting plate extends laterally of the hood a sufficient length to direct airflow away from the front and along the sides of the vehicle. A fastening arrangement releasably fastens the deflecting plate to the vehicle. A support for the plate resists the forces of the air flowing against the deflecting plate during movement to hold the plate in position during use and is adjustable to enable changing the angular disposition of the upper edge portion of the plate so that the upper edge portion is always directed substantially toward the roof of the vehicle during use.

2 Claims, 8 Drawing Figures

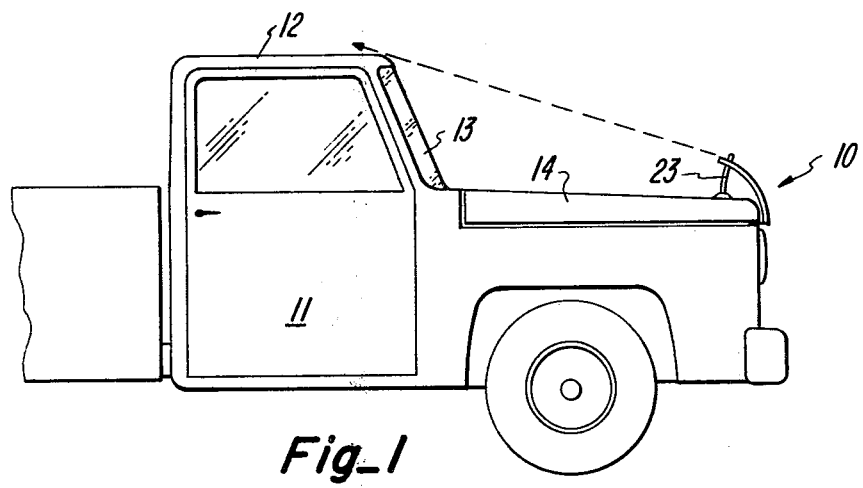
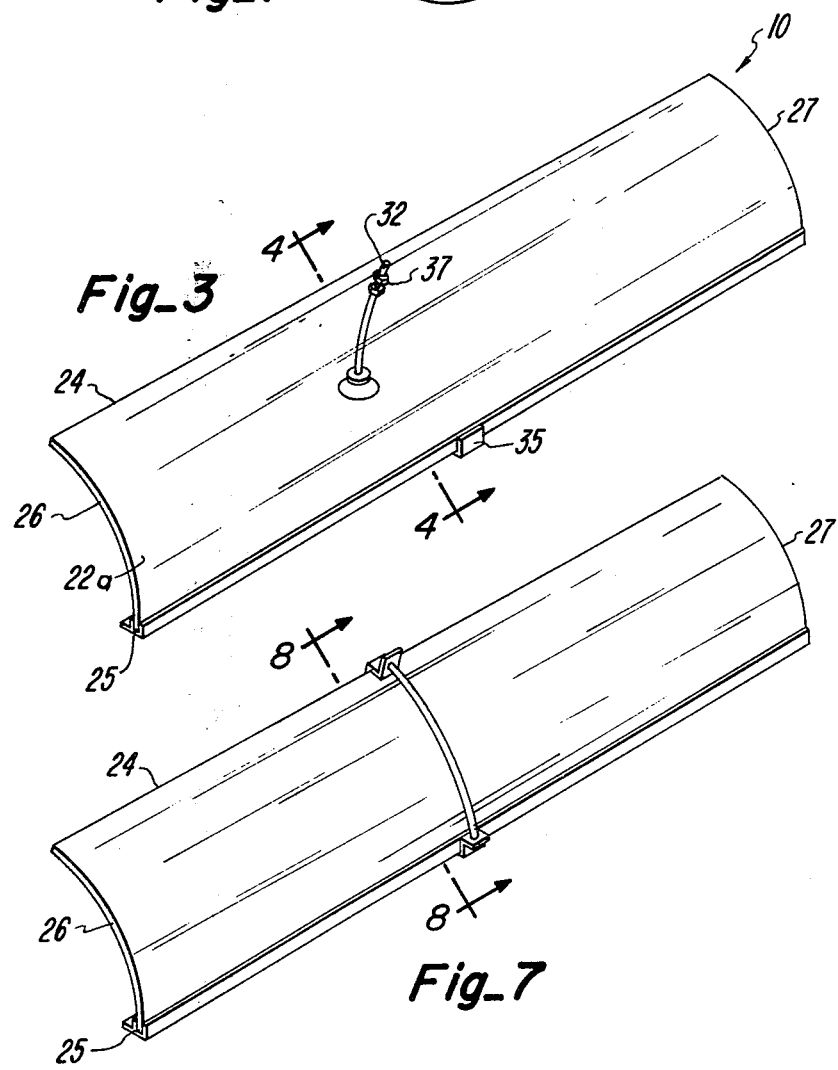

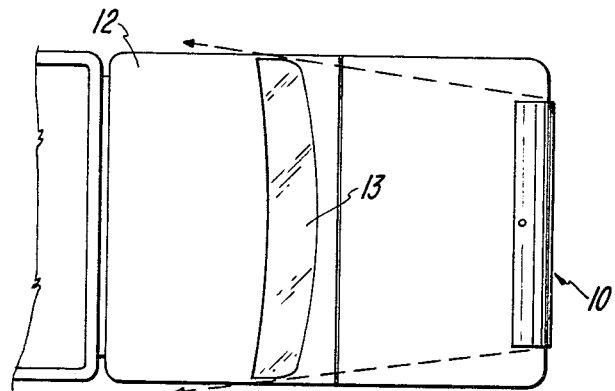
Fig_2
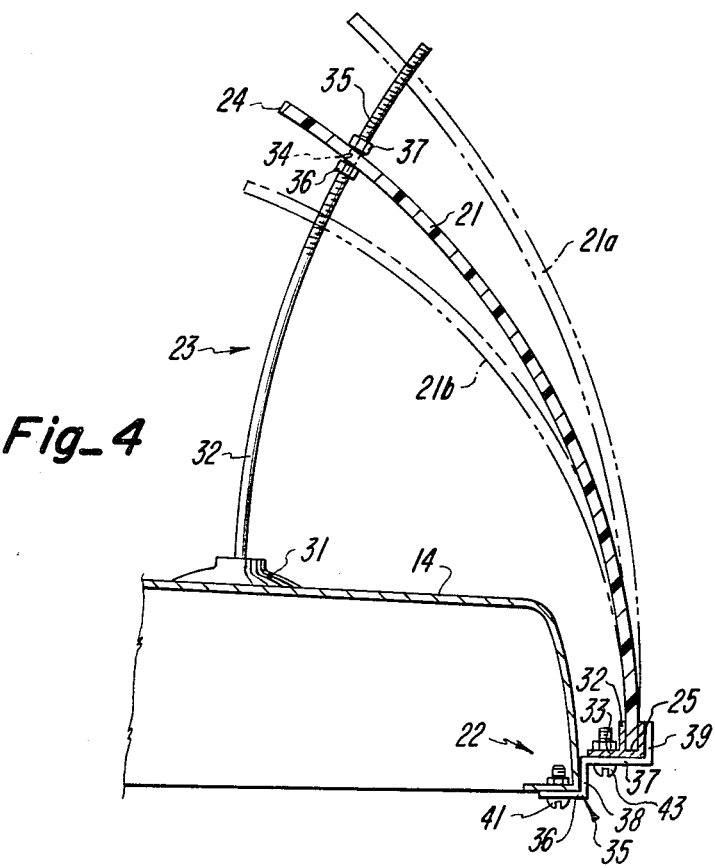
Fig_4

U.S. Patent   Apr. 21, 1981   Sheet 3 of 3   4,262,954
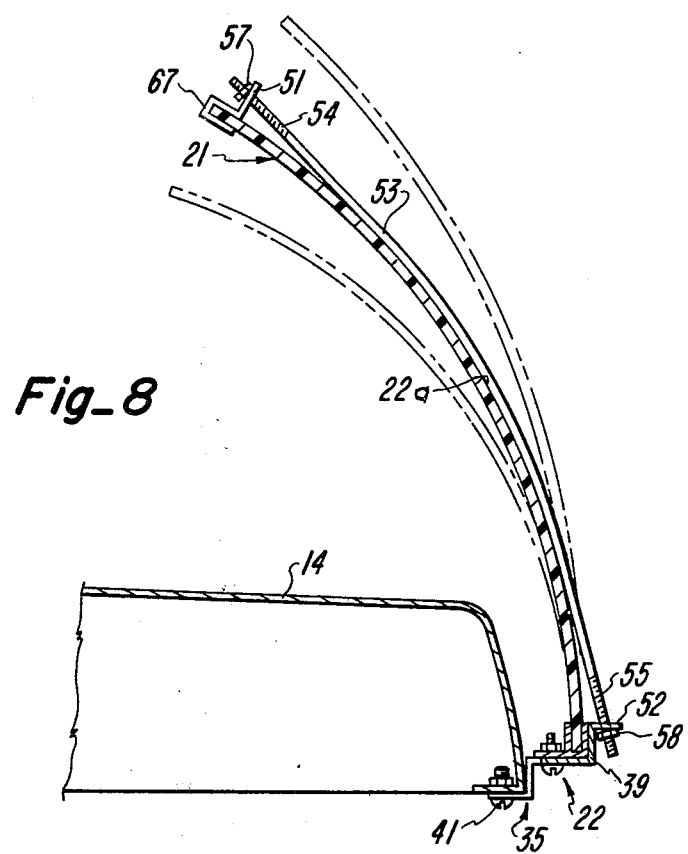
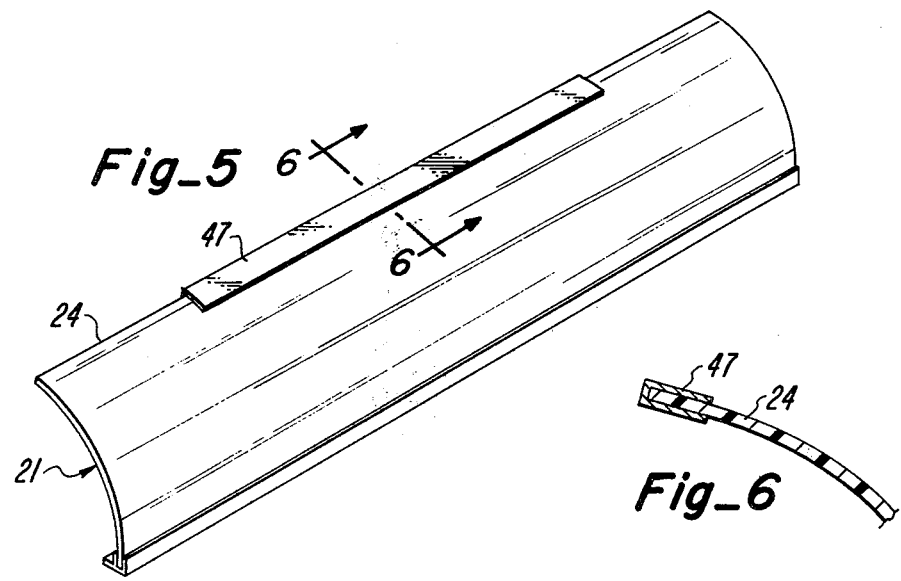

FRONTAL ASSEMBLY FOR VEHICLES

TECHNICAL FIELD

This invention relates to a novel and improved frontal assembly for land vehicles.

Present land vehicles, and particularly trucks or pick-up-type vehicles, exhibit considerable drag and instability as a result of air flowing against frontal surfaces during vehicle movement.

BACKGROUND ART

A variety of drag-reducing frontal assemblies that mount at the front of the vehicle have been proposed for land vehicles. In general these prior attempts at providing frontal assemblies have taken the form of a forward upright surface to direct the airflow to the side with trailing surfaces arranged along a rearwardly diverging V-shape or rearwardly diverging curves as viewed from the top and direct the airflow away from the front and along the outer sides of the vehicle. U.S. Pat. No. 3,762,758 provided a hollow airfoil with a rounded front as viewed from the top and sloping top as view from the side.

DISCLOSURE OF INVENTION

In accordance with the present invention there is provided a deflecting plate with a convex frontal surface that extends up and back along a curve to cause air to flow upwardly and rearwardly in a rolling action and then back over the roof of the vehicle as well as to direct the air along the sides of the vehicle to reduce drag, increase wheel traction and shield the windshield. A bracket releasably fastens the deflecting plate to the vehicle. An upper channel member is provided on the deflecting plate for added strength when thinner material is used. A support at the front or rear of the deflecting plate, or both, resists the forces of the air flowing against the deflecting plate to hold the deflecting plate in position during use to direct the airflow over the roof of the vehicle.

BRIEF DESCRIPTION OF DRAWINGS

The details of the present invention will be described in conjunction with the accompanying drawings, in which like parts have similar reference numerals and in which:

FIG. 1 is a side elevational view of a frontal assembly of the present invention mounted on the hood of a conventional pickup-type vehicle;

FIG. 2 is a top plan view of FIG. 1;

FIG. 3 is a front perspective view of the frontal assembly of FIGS. 1 and 2 removed from the vehicle;

FIG. 4 is a sectional view taken along lines 4—4 of FIG. 3;

FIG. 5 is a front perspective view of a frontal assembly with an upper channel member;

FIG. 6 is a sectional view taken along lines 6—6 of FIG. 5;

FIG. 7 is a front perspective view of a modified form of frontal assembly with a forward support; and FIG. 8 is a sectional view taken along lines 8—8 of FIG. 7.

DETAILED DESCRIPTION

Referring now to FIGS. 1 and 2 of the drawings, the frontal assembly 10 of the present invention is shown mounted at the front of a conventional pickup-type vehicle 11 having a roof 12, a windshield 13 and a hood 14. The frontal assembly 10, generally stated, comprises a deflecting plate 21, a fastening arrangement 22 for releasably fastening the plate at the front of the vehicle generally in front of the hood, and a rear support assembly 23.

The deflecting plate 21 has a smooth convex frontal surface 22a that extends up and back along a continuous curve of a selected radius, as viewed from the side, together with an upper edge portion 24 and a lower edge portion 25. The deflecting plate 21 is of a sufficient length to extend laterally along a major portion of the hood and preferably terminates short of the full width of the hood at upright side edge portions 26 and 27, and this serves to direct air to each side of the vehicle to reduce drag. Plate 21 is made of a rigid, durable material, preferably a sheet of Plexiglas, having a uniform thickness. A rigid lower channel member 32 with a flange 33 is mounted along the lower edge portion 25 of the plate and is shown to extend the full length thereof.

The rear support assembly 23 includes a base 31 suitably affixed to the hood, as by bolt fasteners or an adhesive, and an upright rod 32 extending up from the base and through an aperture 34 in the deflecting plate. The rod 32 has external threads 35 on the upper end and a nut 36 threaded on the rod the deflecting plate and a nut 37 threaded on the rod above the deflecting plate. The function of the rear support assembly is to resist the forces of the air against the deflecting plate 21 during movement thereof to hold the plate in position so that the upper edge portion 24 is always directed substantially toward the roof of the vehicle during use, thereby causing air flow over the roof and increase wheel traction.

The angle of inclination of the upper edge portion 24 of the deflecting plate is changed by moving the nuts 36 and 37 along the rod, as indicated in dashed lines at 21a and 21b in FIG. 4, for the purpose of having the upper edge portion directed toward the roof of the vehicle during use so that the air will flow over the roof to increase wheel traction.

The fastening arrangement 22 for the deflecting plate 21 is shown in the form of a mounting bracket 35 having a lower flange portion 36 and a step portion 37 joined to the lower flange portion by a lower upright portion 38 with an upper upright portion 39 projecting up from the step portion 37. The lower flange portion 36 has an aperture through which a bolt-type fastener 41 extends to fasten the bracket 35 to the hood 14. The lower channel member 32 rests on the step portion 37 and against upright portion 38 and flange 33 has an aperture through which a bolt-type fastener 43 extends to fasten the lower channel member 32 to the flange 35 and thereby the lower edge portion of the deflecting plate to the hood 14. It has been found that for most applications only a single mounting bracket at the center of the deflecting plate is required, but it is understood that additional similar brackets at suitable laterally spaced intervals may be utilized for some applications.

In a modified form the frontal assembly shown in FIGS. 5 and 6 there is provided a rigid upper channel member 47 mounted along the upper edge portion 24 that is centered in relation to the length of the plate 21 but does not extend the full length thereof. This channel member is optional but has been found to be preferred for added strength, as for example to enable the use of a plate thickness of 3/16 inch Plexiglas for plate 21. It has been found that a plate thickness of ¼ inch Plexiglas is preferable if no upper channel member is used.

A forward support assembly 47 is shown in FIGS. 7 and 8 which includes an upper ear 51 fastened to or made an integral part of upper channel bracket 67 or channel member 47, as shown in FIGS. 6 and 7, and a lower ear 52 made integral with or a part of the flange 35. Each of the ears 51 and 52 has an aperture through which a rod 53 extends and the rod has external threads 54 and 55 at the opposite end portions. Nuts 57 and 58 are threaded on the threaded ends 54 and 55, respectively, of the rod beyond the ears 51 and 52, respectively, and these nuts bear against the associated ears 51 and 52 and are adjustable along the rod 53 to change the angle of inclination of the upper edge portion of the deflecting plate. The function of the forward support assembly 47 is similar to that of rear support assembly 23 and may be used independently or together for added holding support of the deflecting plate during use.

By way of illustration and not limitation, the length of the deflecting plate is sixty inches or, alternatively, fifty-two inches so as to traverse a major portion of the width of the front of present land vehicles. The sheet of material for the deflecting plate is twelve inches or eight inches in width.

In operation on the vehicle, the deflecting plate 21 causes the air to flow upwardly and rearwardly in front of the hood in a rolling action and along the sides to reduce drag, thereby increasing gas mileage, and then the air is directed back over the hood and over and against the roof of the vehicle so as to increase wheel traction and improve stability. Airflow also moves from the side edge portions 26 and 27 away from the windshield along each side of the vehicle to reduce drag and increase stability. Moreover, the deflecting plate serves to shield the windshield against rocks, mud and the like since the airflow is directed above and around the windshield.

From the foregoing it is apparent that the frontal assembly of the present invention is applicable to a variety of types of land vehicles, is readily mounted at the front, and preferably to the hood, and is effective in reducing drag and increasing stability.

What is claimed is:

1. A frontal assembly for a vehicle having a hood, windshield, and roof comprising a deflecting plate attachable at the front of the vehicle having a convex frontal surface arranged for extending up and back along a curve as viewed from the side for causing air to flow upwardly and rearwardly in front of the hood in a rolling action, back over the hood, and over the roof of the vehicle whereby to reduce drag, increase wheel traction and shield the windshield;

support means adapted to connect between said deflecting plate and the vehicle to resist airflow forces against said plate for holding said plate in position in relation to the hood during use, said support means including an upright member supported by and projecting up from the hood and passing through the deflecting plate and having external threads with nuts threaded thereon above and below said plate.

2. A frontal assembly for a vehicle having a hood, windshield, and roof comprising a deflecting plate attachable at the front of the vehicle having a convex frontal surface arranged for extending up and back along a curve as viewed from the side for causing air to flow upwardly and rearwardly in front of the hood in a rolling action, back over the hood, and over the roof of the vehicle whereby to reduce drag, increase wheel traction and shield the windshield;

support means adapted to connect between said deflecting plate and the vehicle to resist airflow forces against said plate for holding said plate in position in relation to the hood during use, said support means including a front support assembly having an upper ear fastened to an upper edge portion of said plate, a lower ear fastened to the lower edge portion, and a threaded rod extending through apertures in said ears held in place by nuts threaded on the end of said rod beyond and bearing against said ears.

* * * * *